United States Patent
Skogö et al.

(10) Patent No.: US 10,198,070 B2
(45) Date of Patent: *Feb. 5, 2019

(54) FAST WAKE-UP IN A GAZE TRACKING SYSTEM

(71) Applicant: Tobii AB, Danderyd (SE)

(72) Inventors: Mårten Skogö, Danderyd (SE); Anders Olsson, Danderyd (SE); John Mikael Elvesjö, Danderyd (SE); Aron Yu, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,030

(22) Filed: Sep. 18, 2017

(65) Prior Publication Data

US 2018/0129281 A1    May 10, 2018

Related U.S. Application Data

(63) Continuation of application No. 13/962,151, filed on Aug. 8, 2013, now Pat. No. 9,766,699.

(30) Foreign Application Priority Data

Aug. 9, 2012  (EP) .................................... 12179867

(51) Int. Cl.
   *G06F 3/01*    (2006.01)
(52) U.S. Cl.
   CPC .............. *G06F 3/013* (2013.01); *G06F 1/325* (2013.01)
(58) Field of Classification Search
   CPC ....................................................... G06F 3/013
   See application file for complete search history.

(56) References Cited

U.S. PATENT DOCUMENTS

| | | | | |
|---|---|---|---|---|
| 5,517,021 A | * | 5/1996 | Kaufman | ................ A61B 3/113 |
| | | | | 250/221 |
| 2002/0039111 A1 | * | 4/2002 | Gips | ....................... G06F 3/011 |
| | | | | 715/700 |

(Continued)

FOREIGN PATENT DOCUMENTS

| | | |
|---|---|---|
| FR | 2905586 A1 | 3/2008 |
| WO | 02/01336 A2 | 1/2002 |

OTHER PUBLICATIONS

Dong, et al.; "Self-adaptive iris image acquisition system"; Bellingham, WA, USA; vol. 6944, 2004, XP040436872; pp. 694406-1-694406-9.

(Continued)

*Primary Examiner* — Vijay Shankar
*Assistant Examiner* — Cory A Almeida
(74) *Attorney, Agent, or Firm* — Kilpatrick Townsend & Stockton LLP

(57) ABSTRACT

A gaze tracking system, leaving a low power mode in response to an activation signal, captures an initial burst of eye pictures in short time by restricting the image area of a sensor, with the purpose of enabling an increased frame rate. Subsequent eye pictures are captured at normal frame rate. The first gaze point value is computed memorylessly based on the initial burst of eye pictures and no additional imagery, while subsequent values may be computed recursively by taking into account previous gaze point values or information from previous eye pictures. The restriction of the image area may be guided by a preliminary overview picture captured using the same or a different sensor. From the gaze point values, the system may derive a control signal to be supplied to a computer device with a visual display.

20 Claims, 2 Drawing Sheets

(56) References Cited

U.S. PATENT DOCUMENTS

2004/0227699 A1* 11/2004 Mitchell ................ A61B 3/113
  345/44
2009/0295682 A1* 12/2009 Qvarfordt ............... G06F 3/011
  345/8
2010/0079508 A1* 4/2010 Hodge .................... G06F 3/013
  345/697

OTHER PUBLICATIONS

Hennessey, et al.; "Fixation Precision in High-Speed Noncontact Eye-Gaze Tracking"; Piscataway, NJ, USA; vol. 38, No. 2, Apr. 1, 2008; XP011344902; pp. 289-298.

* cited by examiner

FAST WAKE-UP IN A GAZE TRACKING SYSTEM

CROSS-REFERENCE TO RELATED APPLICATIONS

This patent application is a continuation of U.S. Patent Application No. 13/962,151, filed Aug. 8, 2013, now U.S. Patent No. 9,766,699, which claims the benefit of European Patent Application No. 12179867.2, filed Aug. 9, 2012. The contents of the above identified documents are hereby incorporated by reference, for all purposes, as if fully set forth herein.

TECHNICAL FIELD

The invention disclosed herein generally relates to eye tracking (determination of eye position, gaze point or gaze angle) for providing input data to a computer system. In particular, the invention provides a method enabling fast wake-up from a sleep mode of a gaze tracking system adapted to determine the gaze point of a viewer who watches a visual display forming part of a portable or stationary personal computer device, a TV set, a heads-up display in a vehicle, a near-eye display or a display in a communication device with imaging and computing capabilities, such as a mobile telephone.

BACKGROUND

Eye tracking systems forming part of human-machine interfaces (HMIs) are subject to severe restrictions on power consumption, especially in personal computers and battery-powered devices. Many available eye tracking systems are programmed to enter a sleep mode after a period of no input from a user. From the point of view of energy economy, the period should be as short as possible, so that the eye tracking system will be in a sleep mode a large percentage of the time. This must be balanced against the desirability of high responsiveness of the system, which would seem to advocate a relatively longer period to elapse before sleep mode is entered. This tradeoff may become less awkward, however, if efforts are directed at reducing the wake-up time of the system.

SUMMARY OF THE INVENTION

It is in view of the above considerations that the inventors have made the present invention, which reduces or at least mitigates the problems known to be associated with the prior art. As such, it is an object of the present invention to provide eye tracking equipment with competitive power management characteristics but low latency to user interactions at all instances when the equipment is operating, including any power-saving or 'sleep' mode. A further object is to provide a gaze tracking system that can be integrated in a personal computer system (e.g., desktop or laptop computer, tablet computer, notebook, net book, ultrabook, all-in-one desktop, TV, smart phone, personal digital assistant, digital camera, heads-up display, near-eye display) without burdening the power performance of the computer system.

At least one of these objects is achieved by a method, computer program product and gaze tracking system with the features set forth in the independent claims. The dependent claims define embodiments of the invention.

A gaze tracking system communicates with at least one sensor with a light-sensitive surface arranged to receive light (which is reflected) from the head of a viewer of a visual display associated with a computer device. The at least one sensor may be a proper part of the gaze tracking system or may be external to the system, e.g., may be provided as a peripheral component. The gaze tracking system is adapted to control the computer device by providing a control signal to the computer device in accordance with the viewer's detected gaze point on the visual display.

As used herein, a computer device may include a device with which the viewer interacts, e.g., a personal computer executing an application program which the viewer may control via a human-machine interface integrated in the personal computer or provided as a peripheral device. Further, the viewer may interact with software, or a system software or middleware via a human-machine interface integrated in the personal computer or provided as a peripheral device. Furthermore, a computer device may refer to a software or hardware interface arranged between the gaze tracking system and a personal computer executing such an application program. As such, the control signal may contain data representing the viewer's gaze point, which the downstream computer device may process further to ascertain what action is to be taken. Alternatively, the control signal contains a specific computer-readable command derived at least in part from the gaze point, possibly in a format suitable for interpretation by an application program.

According to an example embodiment, the gaze tracking system leaves a low power mode, e.g. a sleep mode, of the gaze tracking system in response to receiving a gaze tracking activation signal from one or more input means in the computer device. The gaze tracking system captures an overview picture of at least a portion of the head of the viewer, or in case of multiple viewers at least a portion of the head of one of the viewers, and derives information related to the location of the eye region of the viewer, e.g., a bounding box, an estimated location of one or both eyes. The gaze tracking system captures a plurality of pictures of the head of the viewer or at least a portion thereof. Doing so, the gaze tracking system reads out data at a first frame rate, in embodiments a frame rate being increased compared to a frame rate during normal operation, from restricted regions of the at least one sensor. The regions may be restricted in the sense that their union occupies at most a first predetermined portion of the area of the light sensitive surface of the at least one sensor. In embodiments of the present invention, the first predetermined portion is at most 10% of the area of the light-sensitive surface of the at least one sensor. The restricted regions may be positioned in accordance with the eye region location derived from the overview picture. Next, the gaze tracking system determines a first value of the viewer's gaze point on the visual display based on information extracted from said plurality of pictures and optionally on information from the overview picture; this operation in the gaze tracking system is independent of further imagery but may take into account configuration settings, user-dependent and equipment-dependent calibration data and similar system constants. Based on the first gaze point value thus determined, the gaze tracking system provides a first control signal to said computer device. After providing said first control signal, the gaze tracking system moves on to capturing further pictures of at least a portion of the viewer's head by operating said at least one sensor at a second frame rate, which in embodiments of the present invention is the frame rate during normal operation. For one of said further pictures, the system determines a further gaze point value based on information both from said further picture and from at least one previous picture. Said previous picture may be a picture in the said plurality of picture or may be one of the earlier pictures among said further pictures.

The quantity identified as frame rate in the claims may be determined as the number of complete image frames—whether of the full sensor, a smaller portion of the sensor or of a restricted region of the sensor—that are captured per unit time. The inventors have realized that, in the case where an image sensor is partitioned into pixels, the frame rate is typically determined inter alia by an explicit or hidden upper limit on the number of pixels that can be read out per unit time. Hence, if data are read out only for a restricted region, this may be performed at a higher frame rate, which shortens the total time required for the wake-up procedure.

With regard to the condition formulated as a percentage of the union of the restricted regions, the following is noted. A benefit of observing this condition is that the available imaging resources (data transfer rate, time, processing capability) are concentrated at a limited portion of the light-sensitive surface. If a larger area is covered by juxtaposing (possibly partially overlapping) restricted regions, so that the union of the restricted regions reaches a substantially larger percentage, then the imaging resources will not be concentrated at a limited portion of the light-sensitive surface. Instead, available resources are spent on imaging a larger scene, which may lead to either a longer wake-up time in the gaze tracking system or a degradation of the accuracy. Further, the amount 10% (=area of union of restricted regions/area of full light-sensitive surface) is expressed primarily in relation to a system where the full light-sensitive surface, in normal conditions (distance, etc.), provides an image size corresponding to the viewer's entire head when optimally positioned. Preferably, the light-sensitive surface is also at least twice as wide in the horizontal direction. It will be apparent to the skilled person that the actual percentage occupied by the restricted regions may vary (for a given set of restricted regions) in response to a change in the light-sensitive surface area and/or (for a given area of the light-sensitive surface) in response to a change in the set of restricted regions. The restricted regions may be made even smaller—such as less than 5% or less than 3% of the area of the full light-sensitive region—which may shorten the wake-up process but may also require use of equipment with smaller tolerances.

In one example embodiment, the first gaze point value is determined in a stateless or memoryless fashion, while the further gaze point value is determined in a stateful or memoryful fashion. In particular, the first gaze point value may be computed non-recursively while the further gaze point value may be computed recursively on the basis of previous pictures of the viewer's head or on the basis of previous gaze point values. It is known that recursion, iteration and similar approaches improves accuracy by relying on previous results or previous input data. In this example embodiment, the apparent inability to do so for the first gaze point determination is compensated by providing a richer set of input data, namely by enabling sensor operation at an increased frame rate.

In one example embodiment, said plurality of pictures comprises three consecutive pictures. Optionally, a recursive or iterative computation algorithm for determining the gaze point may take an equal number of pictures into account, e.g., one current picture and two previous pictures. The number of pictures to be included depends on the expected difficulty (which may be related inter alia to the typical signal-to-noise ratio) in determining the gaze point in the particular application, as well as on the required accuracy of the gaze point. As such, variations of this example embodiment may include basing the gaze point determination on a smaller or larger number of pictures of the at least one eye of the viewer.

In one example embodiment, the first gaze point is determined by jointly filtering pictures in said plurality of pictures or a quantity derived from said pictures, and said further gaze point is determined by jointly filtering said further picture, and at least one previous picture or a quantity derived from said pictures. Filtering may involve use of a finite impulse response filter or an infinite impulse response filter, particularly a recursive filter. Along the lines of the discussion above, filtering may use a previous picture as (partial) input or may use a quantity derived from a previous picture, e.g., a gaze point value. By joint filtering is meant an operation, which may be composed of sub-operations, with the purpose of determining one gaze point value. Joint filtering does not primarily refer to an arrangement comprising plural filtering instances carried out in parallel and yielding separate final results. As such, a joint filtering operation designed to provide a further gaze point value and having as input a current picture and a previous picture typically takes both these pictures into account to compute a single further gaze point value.

In a further development of the preceding example embodiment, the gaze tracking system is adapted to derive a gaze point guess from one or more pictures. In particular, the gaze point guess may be derived from a single picture; alternatively, it is derived from several pictures, such as all pictures in said plurality of pictures. The gaze point guess may be derived using a numerical method known per se in the art. Based on these, the gaze tracking system determines a gaze point value by filtering several gaze point guesses, e.g., by averaging. Hence, even if the numerical method by which each gaze point guess is provided is known to be sensitive to errors in the input data (the pictures), the gaze tracking system as a whole will be less sensitive than the numerical method, by virtue of the subsequent filtering. In a further development hereof, the gaze tracking system may be configured to initiate filtering only if the gaze point guesses remain in a bounded range. This is effectively a condition on maximal gaze drift, to the effect that successive eye pictures that belong to a saccade rather than to a fixation or smooth pursuit will not be subject to averaging. If the gaze tracking system determines in this manner that there exists only one picture of the eye in its present position (i.e., after a saccade), it may choose to capture further pictures of the eye, until there are a sufficient number of eye pictures for which the gaze point guesses are sufficiently close. Alternatively, the gaze tracking system may exceptionally output the gaze point guess as the gaze point. Alternatively, for example embodiments where the gaze tracking system responds to a request for information about the viewer's gaze point at the time of the gaze tracking activation signal, multiple gaze point guesses on a (final portion of a) saccade following the gaze tracking activation signal may be used to determine where the saccade came from and thus where the viewer's gaze was located at the time of the gaze tracking activation signal.

In one example embodiment, the configuration of the region to which the at least one sensor is restricted is guided by an overview picture of the head of the viewer. As discussed previously, the overview picture may be used for the purpose of finding an eye region location. It is not essential what particular device or component provides the overview picture to the gaze tracking system, but several options are available.

Preferably, the overview picture is captured by reading out data from the full light-sensitive surface, or more than 50% thereof, in the at least one sensor. For instance, the gaze tracking system may be configured to restrict the sensor, based on the overview picture, to the viewer's eye region, a region around one of the eyes or one region around each eye. To further shorten the total duration of the wake-up procedure, the sensor may be operated at reduced (spatial) resolution when it captures the overview picture, preferably in a reduced resolution mode. Because each pixel will then collect a wider beam of light, excitation energy above a system-specific detectability threshold will be gathered in less time. The reduction in spatial resolution may be achieved by binning. This may entail reading out all pixels in a group of adjacent pixels (or every other pixel in a group of adjacent pixels) as one virtual pixel, so that excitation energy is accumulated; the adjacent pixels may be grouped in 2×2 pixel groups, 4×4 pixel groups, groups according to rectangular patterns and the like. Alternatively or additionally, the resolution can be changed by skipping certain pixels. For instance, it is possible to read out data only from a subset of the pixels, e.g., by reading out only every $N^{th}$ pixel, whereby an image at a lower resolution can be collected in shorter time.

Still in the interest of shortening the wake-up procedure, the overview picture may be captured with active illumination. This may be achieved by activating at least one light source emitting light towards the head of the viewer. The activated light source is preferably of a wide-angle type, providing general lighting that may be expected to increase image contrast between different portions of the eye and the surrounding region.

By applying resolution reduction and/or active illumination, the exposure time required to capture the overview picture may be reduced to less than half the normal exposure time in ambient lighting conditions and full resolution. In some implementations, the exposure time may be reduced to a quarter of the normal value or even less.

As an alternative implementation, the overview picture is captured in the form of a depth picture. The depth picture may be provided by a depth sensor, to be understood as a device for providing a two-dimensional array of depth data of a scene. The depth sensor may be integrated in the gaze tracking system or may be associated with the system, such as by the intermediary of a computer device, to which the system is communicatively connected. In particular, a depth sensor intended for consumer products may include an infrared or near-infrared laser projector combined with a monochrome CMOS sensor with sensitivity in that wavelength range. Alternatively, an illuminator emitting in the visible range is combined with a corresponding light sensor. A depth sensor may be a time-of-flight instrument measuring the time from emission of a light pulse to receipt of its reflection. Alternatively, the depth sensor may illuminate the scene by structured light (e.g., dot patterns, stripes) and apply triangulation methods. Alternatively, the depth sensor includes two or more cameras and derives the depth map stereoscopically, such as based on two or more pictures of a portion of the viewer's head which are captured in a short time window or simultaneously. The depth sensor may include the at least one sensor referred to previously; for instance, the at least one sensor may be combined with a suitable light source or may be one or both cameras (supposing at least two sensors are provided) in a stereoscopic pair. A particular benefit with using a depth sensor is that additional information, e.g., regarding the spatial location of an eye, may be derived from the same depth picture. Indeed, because the spatial eye location typically varies more slowly than the eye orientation, depth pictures intended for this purpose are typically captured less frequently than eye pictures, in order to save resources. Availability of an estimate of the spatial location of the eye is useful in gaze tracking according to the PCCR approach and similar techniques.

In one example embodiment aiming to further reduce the total wake-up time, the gaze tracking activation signal triggers an interrupt in the gaze tracking system. In an implementation where the gaze tracking system and the computer device communicate over a bus interface with a protocol that gives priority to certain packet types, the gaze tracking activation signal may alternatively, but with an equivalent effect, be transmitted as a packet of the prioritized type. In particular, if a USB (Universal Serial Bus) interface is used, the gaze tracking activation signals may be a request-type message which according to the USB is to be handled within a period of reduced duration.

In one example embodiment, said further pictures are captured subject to a less stringent restriction on the image region, or even no restriction at all (i.e., data are read out from the entire light-sensitive surface or at least a substantial portion thereof). This advantageously makes the determination of the gaze point more robust against fast head movements, which may cause a sudden shift of the previous eye location. Such robustness is particularly useful when the sensor is operated at normal frame rate rather than increased frame rate. In a further development of this example embodiment, the region from which data are read out is enlarged and/or repositioned adaptively in dependence of a detected head movement. In particular, the region may be enlarged by peripheral padding by a number of pixels that is related to an estimated momentary movement velocity at the surface of the head (including both rotary and translational motion). In particular, the region may be repositioned (to a new location on the light-sensitive area) by translation in a direction derived from an estimated momentary head velocity vector. In particular, the region from which data are read out to capture said plurality of pictures (underlying the determination of the first gaze point value, at least in part) may be updated by pure repositioning, wherein it maintains a fixed first format (representing a first area) but is repeatedly translated over the light-sensitive surface in accordance with an estimated direction of motion and/or speed of motion. When pictures are captured for the purpose of determining the further gaze point value, a fixed second format it used, which differs from the first format at least in that it represents a second area, which is greater than the first area. The second area may be at least 1.25 times the first area, such as 1.5 times the first area, such as 1.75 times the first area, such as 2 times the first area, such as 3 times the first area. Alternatively, the first and second formats may differ in that they comprise different numbers of pixels. In particular, the second format may comprise at least 1.25 times (such as 1.5 times, 1.75 times, 2 times, 3 times) the number of pixels in the first format.

In one example embodiment, the ratio between the first frame rate, i.e. the increased frame rate (in number of frames per unit time), and the second frame rate, i.e. the normal frame rate, is at least 2, such as at least 5, such as at least 10, such as at least 20, such as at least 50. The normal frame rate may be approximately 40 Hz±10 Hz, while the increased frame rate may be 300 Hz±100 Hz.

In one example embodiment, the input means which emit the gaze tracking activation signal is of a non-gaze type. Further preferably, the input means include a body gesture sensor, an acoustic transducer, a touch detector, a pointing device or a proximity sensor. The body gesture sensor may be optical, such as for instance a system for remote depth sensing which has gesture recognition functionality. The acoustic transducer may be combined with a speech recognition processor to form a voice-based input means. The touch detector may be optical, capacitive or electromechanical and may be integrated in a visual display, a touch pad or a keyboard. The pointing device may be a mouse, joystick, drawing pad or the like. The proximity sensor has the functionality of producing a positive proximity indication when it establishes that a body part is closer than a threshold distance to the sensor. The proximity sensor may be of an optical type or a non-optical type, including capacitive.

In one example embodiment, still in the interest of reducing the wake-up time, said plurality of images are captured using a sensor of the rolling shutter type. A characteristic of a rolling shutter sensor, distinguishing it from a global shutter sensor, is that all pixels are not imaged at a single point in time but rather by scanning across the sensor according to a predefined scanning pattern. The predefined scanning pattern may be along horizontal or vertical lines in some order. Unlike a rolling shutter sensor, a global shutter sensor may attempt to approximate a snapshot photograph by recording an entire frame in a common time window. Rolling shutter sensors typically provide faster data readout, which may ideally (neglecting inter alia any blanking lines and blanking columns in the data format) be limited only by the ratio of the size of the readout region and the data transfer rate. This allows the gaze tracking system to begin gaze-point processing of said plurality of images earlier. In particular, the gaze tracking system may begin processing before all pixels in the region have been read out. Importantly, rolling shutter sensors typically provide a finer pixel pitch than a comparable global shutter sensor (e.g., 1.1 μm vs. 3 μm). Because of the well-known unpleasant non-synchronicity of the pixels in each image, which appears to make the subsequent gaze point derivation more difficult, the use of a rolling shutter sensor in gaze tracking equipment is non-obvious. In this example embodiment however, as the inventors have realized, the restriction on the image area removes this inconvenience to a large extent.

In one example embodiment, the wake-up procedure ends with a ready mode, which the gaze tracking system maintains for a predetermined period. The gaze tracking system is ready to handle additional activation signals in the ready mode. The additional activation signals are not necessarily gaze tracking activation signals but may be signals in an HMI by which the viewer interacts with the computer device. If no additional activation signal is received during the predetermined period, the gaze tracking system goes back to the low power mode, e.g. the sleep mode. Similarly, if one or more additional activation signals have indeed been received but the predetermined period has elapsed after the last event, the system behaves similarly. The duration of the predetermined period may be selected in dependence of the desired responsiveness of the computer device (which may be experienced as reduced if the gaze tracking system introduces significant latency) and on the available power. In one implementation, the predetermined period may last approximately 30 seconds. In its ready mode, the gaze tracking system may operate the at least one sensor at a relatively lower frequency (or frame rate). For instance, the lower frequency may be less than ½ of the higher frequency, preferably less than ¼, such as less than 1/10. This will reduce the contribution from the at least one sensor (and associated processing circuitry) to the total power consumption of the gaze tracking system. Still, the lower frequency may provide sufficient accuracy (including motion accuracy) since updates of the gaze point can be guided by previous values. In its ready mode, further, the gaze tracking system may read data from the full sensor or from a region representing an area smaller than the full sensor.

In one example embodiment, there is provided a gaze tracking system comprising a processor configured to perform the wake-up procedure according to one of the implementations outlined above. The gaze tracking system is associated with at least one sensor, preferably in communicative connection with this. In particular, the at least one sensor may be selectively operable at normal frame rate, wherein data may be read out from a relatively larger selection of regions on the light-sensitive surface (which possibly include the full surface, but there may alternatively be an implementation-specific upper bound on the area of the regions), or at increased frame rate, wherein data are read out from a restricted region. The restricted region may be positioned in different locations on the light-sensitive surface but has a smaller area in order to enable the sought-for increase in frame rate.

Without departing from the scope of the invention, the at least one sensor in the gaze tracking system may comprise two or more sub-sensors, wherein the normal-rate mode includes operating a first sub-sensor and the increased-rate mode includes operating a second sub-sensor. Preferably the first sub-sensor comprises a larger light-sensitive surface than the second sub-sensor.

In one example embodiment, there is provided a computer program product for controlling a gaze tracking system of the type described above.

It is noted that the invention relates to all combinations of features, even if recited in mutually different claims.

BRIEF DESCRIPTION OF THE DRAWINGS

Example embodiments of the invention will now be described with reference to the accompanying drawings, on which.

All the figures are schematic and generally only show parts which are necessary in order to elucidate the invention, whereas other parts may be omitted or merely suggested. Unless otherwise indicated, like reference numbers on different drawings refer to structurally or functionally corresponding elements.

DETAILED DESCRIPTION OF EXAMPLE EMBODIMENTS

Figure 1:
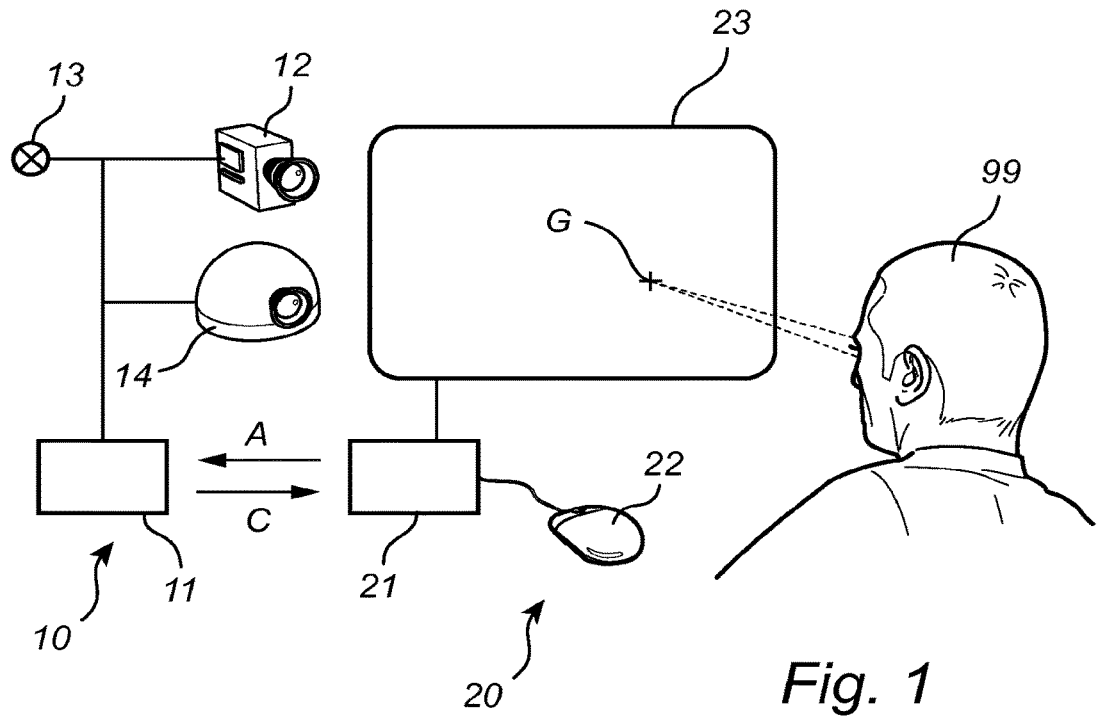
FIG. 1 is a schematic drawing of a gaze tracking system arranged in cooperation with a computer device equipped with a visual display.

As shown in FIG. 1, a gaze tracking system 10 according to an example embodiment comprises a processor 11. The processor is communicatively connected to a light source 13 and two imaging devices 12, 14, which may be external to the system (and located in the same or a different physical device) or may be internal components in the gaze tracking system 10. It is envisaged inter alia that the gaze tracking system is embodied as an internal software or hardware component in a personal computer system (for examples, see above) which acts as interface towards the imaging devices 12, 14 and the light source 13 on one side and further towards a processor in the personal computer system. The gaze tracking system 10 may be embodied as middleware executing under the operating system of the personal computer system. The gaze tracking system 10 may further be distributed, so that some tasks (e.g., processing of pictures) are performed in software executing under the operating system and some tasks (e.g., communicating with the light source 13 and the imaging devices 12, 14) in a processor 11 arranged in a peripheral unit (not shown) associated with the personal computer system. The processor 11 may be implemented at least according to the following options, or any combination of the following options:

a) One or more imaging devices (sensor(s)) are equipped with logic with processing capabilities, which alone or jointly act as what is referred to as the "processor" in this disclosure including the appended claims.

b) A conventional standalone or integrated microprocessor is provided as a component in the gaze tracking system (separately from an associated computer system) in communication with the imaging device. The microprocessor may be programmable by a low or high level language, e.g., assembler or C, and acts as "processor".

c) An external application-specific integrated circuit (ASIC) is provided communicatively connected to the at least one image sensor. The logic is hardcoded as transistors in the ASIC. Hence, the ASIC has limited processing capabilities but still fulfils the tasks attributed to the "processor".

d) The "processor" is a hard-coded integrated part of a CPU in a computer system or is provided in the form of a hard-coded companion chip to the CPU. The computer system may be controllable by the gaze tracking system.

e) The "processor" is a software program executing in the CPU in a computer system. The computer system may be controllable by the gaze tracking system.

f) A microcontroller acts as "processor". The microprocessor may be of a standalone type and may alternatively be integrated in a computer system which is controllable by the gaze tracking system.

Via a wired or wireless, internal or external connection, the gaze tracking system 10 may send and receive signals to an interface 21 in a computer device 20, including receiving an activation signal A and sending a control signal C. If the gaze tracking system is at least partially integrated in the computer system 20, these signals are internal and may be sent over internal communication interfaces, which may be distinguishable physically (e.g. buses, connectors, USB, TCP/IP, PCIe) or completely virtual (e.g., exceptions, events, other software messages exchanged between processes executing in a memory, data exchanged according to a predefined API syntax and the like). The computer device 20 further comprises a visual display 23 and a pointing device 22, drawn as a mouse for exemplary purposes. A user of the computer device 20 may occasionally direct his or her visual attention at the visual display 23, for instance at the example gaze point G shown on the drawing, and will be referred to as a viewer 99 in what follows.

It is pointed out that protection is sought independently for the gaze tracking system 10, for the computer device 20 and for the compound system shown in FIG. 1 as well, in which the gaze tracking system 10 and the computer device 20 constitute two interconnected sections. As noted, the invention may be embodied in different combinations of processing, communication and imaging hardware or software entrusted with gaze-tracking-related tasks, regardless of their being deployed in particular physical units; protection is sought for any such functionally motivated combination as well. The functional and structural characteristics of the gaze tracking system 10 and the computer device 20 according to different example embodiments have been discussed in previous sections of this disclosure and will be further explained below.

In the deployment shown in FIG. 1, the gaze tracking system 10 is configured to control the computer device 20 on the basis of a detected gaze point G, by providing a control signal C to the computer device 20. The properties of the control signal C in different example embodiments have been discussed above. Conversely, the computer device 20 may control a power state of the gaze tracking system 10 by providing an activation signal A. If the gaze tracking system 10 is operable in a low power mode, e.g. a sleep mode, and a normal mode, it may respond to the activation signal A by leaving the low power mode and entering normal mode. As a further possibility, if the gaze tracking system 10 enters the low power mode after expiry of a timer (not shown) with predetermined duration, the gaze tracking system 10 may respond to an activation signal A received in the normal mode by restarting the timer.

To economize energy, the computer system 20 may be configured to issue the activation signal A when it decides that there is a need for gaze tracking input. In some implementations, a mere detected presence of the viewer may be sufficient. As discussed previously, the activation signal A may alternatively be triggered by a voice command, a body gesture or the like. In another implementation, detected use of the pointing device 22 or detected proximity to the pointing device 22 may trigger the activation signal A. In particular, if the pointing device 22 is hand-controlled, e.g., a mouse, joystick or the like, a detected move may trigger the activation signal A. This way, the pointer appearing on the display may jump to the actual gaze point G of the viewer 99, who may subsequently select a graphic control (e.g., associated with a predetermined action to be performed by the computer device 20) by a mouse click or the like, possibly after fine manual adjustment of the pointer position. Similarly, if the pointing device 22 is of a finger-controlled type, such as touch pad to be actuated by one or more fingertips, the positioning of a finger may trigger the activation signal A. In response hereto, the gaze tracking system 10 returns a control signal C indicating the current gaze point, to which the pointer is immediately moved (alternatively, some other visual feedback is shown to indicate detected graphical object at the viewer's gaze point that is due to be selected), and the viewer 99 may adjust the position of the pointer by moving his or her finger(s) over the touch pad before releasing the finger(s) to select a graphical element in the GUI associated with a predetermined action to be performed by the computer device 20. The two processes which have been described in connection with the hand-controlled and finger-controlled pointing devices are methods for human-machine interaction in the compound system, for which protection is sought independently.

Figures 3, 4:
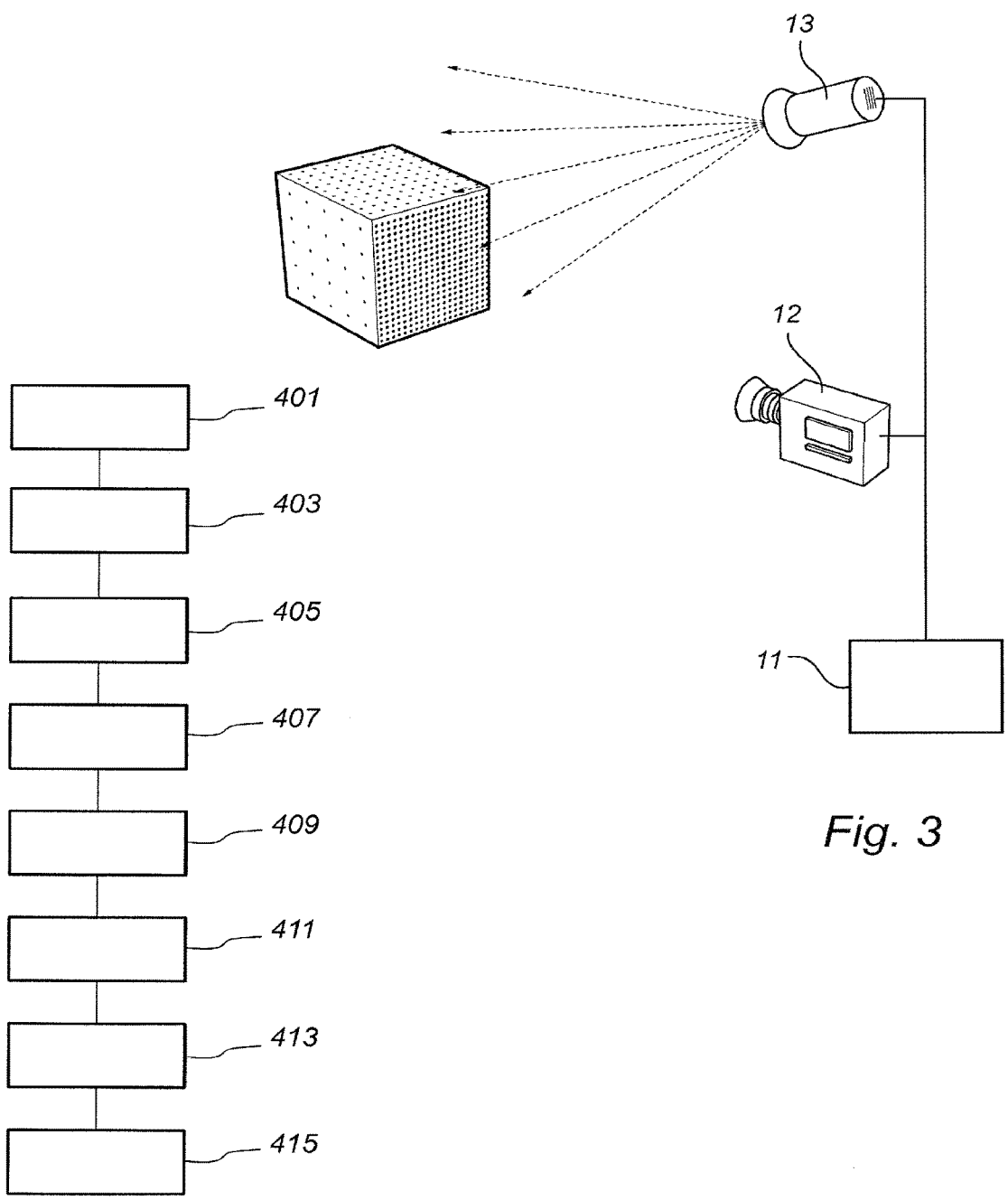
FIG. 3 shows an implementation of a depth sensor.
FIG. 4 is a flowchart of a method in a gaze tracking system.

The imaging devices 12, 14 may be of different types or same type. In other embodiments than the one shown in FIG. 1, the gaze tracking system 10 may comprise a single imaging device 12; as noted above, fast acquisition of an overview picture at full or near full size is possible inter alia if the single imaging device 12 is operable in two different resolutions modes. At least one of the imaging devices 12, 14 is responsible for imaging an eye region of the viewer 99 in order to provide input data for determining a gaze point G. If the gaze tracking system 10 captures an overview picture of the viewer's 99 head or a portion thereof, then either the overview picture is received from an external imaging device (not shown) or at least one of the imaging devices 12, 14 is configured to provide this overview picture. The overview picture may certainly be based on information from both imaging devices 12, 14. As mentioned previously, the imaging devices 12, 14 may be sensitive to visible light, to near-infrared or infrared light. Further possible configurations of the imaging devices 12, 14 and the light source 13 include the following:

a) The imaging devices 12, 14 are two high-resolution CMOS-type sensors, the outputs of which are processed by triangulation to yield the depth map. Alternatively, the processing may be simplified in that the two outputs are processed to yield a distance to an eye or a partial depth map restricted mainly to the eye region. The light source 13 may be used during eye imaging, e.g., providing general illumination or a corneal reflection. The light source 13 may alternatively be used to shorten the exposure time of the overview picture, as explained above.

b) The first imaging device 12 is a higher-resolution CMOS-type sensor, and the second imaging device 14 is a lower-resolution CMOS-type sensor. The first imaging device 12 provides the eye imagery. The depth map is created by operating the second imaging device 14 while simultaneously illuminating the viewer's 99 head by structured or coded light from the light source 13. By way of example, FIG. 3 shows how a periodic pattern of dots can be used to measure the depth at various points in the scene by studying how the pattern transforms on various surfaces (e.g., by rescaling and shearing) in dependence of the angle of incidence.

c) The first imaging device 12 is a higher-resolution CMOS-type sensor, and the second imaging device 14 is a time-of-flight sensor. In an implementation of this type, the light source 13 is preferably modulated and synchronized with the time-of-flight sensor.

The one or more imaging devices responsible for providing the eye imagery may have a limited data output rate (as measured in pixels per unit time), which in turn limits the frame rate at a given image size. As discussed in other parts of this disclosure, gaze tracking algorithms with a recursive-type approach (e.g., one or more previous eye pictures contribute as input data, together with a current eye picture, to a current gaze point value) may lack sufficient input data (e.g., imagery taking the place of the previous eye picture) to complete an initial gaze point calculation at the desired accuracy. To remedy this, according to example embodiments of the invention, a burst of eye pictures are captured at increased frame rate, which is made possible by restricting an image area. In particular, this may include reading out data only from a restricted region (or possibly, a plurality of restricted regions that may differ slightly between consecutive pictures) which occupies at most 10% of the area of a light-sensitive surface in the imaging device. For a general discussion on image area restricting techniques, albeit unrelated to the present problem of reducing a wake-up time, reference is made to WO 2004/45399.

Figure 2:
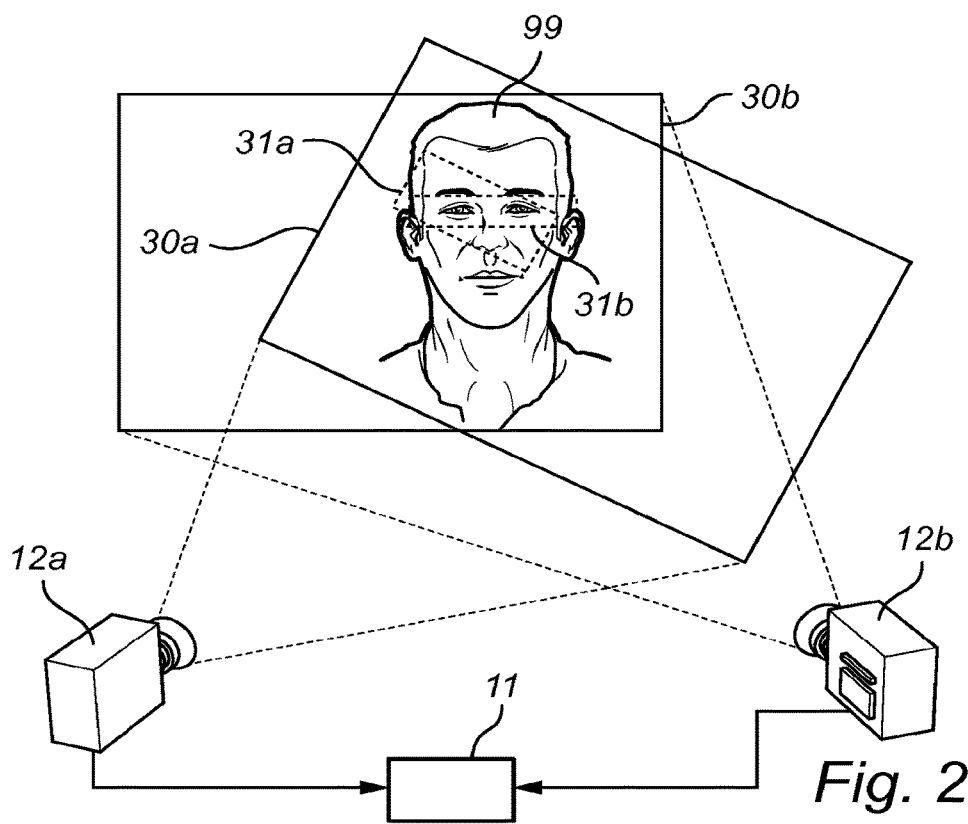
FIG. 2 illustrates the positioning of restricted regions within a light-sensitive surface of an image sensor, with the aim of capturing pictures of a viewer's eye region efficiently.

To illustrate this, FIG. 2 shows the positioning of a restricted region 31 in relation to a full sensor surface 30 for two different imaging devices 12 associated with the processor 11. In the figure, the restricted regions 31 are shaped as rectangles oriented parallel to the full sensor surface 30. This orientation may be advantageous in that the restricted regions 31 will intersect a minimal number of rows and columns in the sensor surface 30, which reduces the amount of blanking lines and blanking columns so that the payload occupies a greater percentage of the data output from each imaging device 12. The size and position of each restricted region 31 may be guided by an overview picture and by searching in the overview picture for visual features (eyebrows, pupil, nose etc.) or by searching for depth patterns (nose outline, supraorbital arches etc.) that are typically found in or near an eye region. The result of the search in the overview picture may be output in the form of coordinates in the overview picture defining a bounding box enclosing the eye region or a location of a reference point in the eye region. These coordinates are then converted into equivalent coordinates in a light-sensitive surface in the concerned imaging device 12. In the situation shown in FIG. 2 shows, the conversions from a common overview picture may have different characteristics due to their different orientations.

Referring now to FIG. 4, there is shown a method in a gaze tracking system for controlling a computer device according to an example embodiment. The method comprises leaving 401 a low power mode of the gaze tracking system in response to a gaze tracking activation signal from input means of the computer device, capturing 403 an overview picture of at least a portion of the head of the viewer and locating an eye region of the viewer in the overview picture, and capturing 405, at a first frame rate, a plurality of pictures of at least a portion of the viewer's head using the at least one sensor, from which data are read out in restricted regions, which are positioned in accordance with the eye region location and the union of which occupies at most 10% of the area of the light-sensitive surface. The method further comprises determining 407 a first gaze point value of the viewer on the visual display based on information from the plurality of pictures only and optionally on additional information from the overview picture, providing 409 a first control signal to the computer device based on the first gaze point value, and capturing 411, at a second frame rate, being lower than the first frame rate, further pictures of at least a portion of the viewer's head using the at least one sensor. The method also comprises the steps of determining 413, for a further picture, a further gaze point value of the viewer on the visual display based on information from the further picture and additionally on information from at least one previous picture, and providing 415 a further control signal to the computer device based on the further gaze point.

Methods described in conjunction with flow charts presented herein may be implemented in a computer-readable medium that includes instructions for causing a programmable processor to carry out the methods described. A "computer-readable medium" includes but is not limited to any volatile or non-volatile media, such as RAM, ROM, CD-ROM, NVRAM, EEPROM, flash memory, and the like. The instructions may be implemented as one or more software modules, which may be executed by themselves or in combination with other software.

There will now be briefly outlined a few examples of gaze point determination algorithms with a recursive or memoryful character for determining a first gaze point value G1 (or a number of initial gaze point determinations) and in subsequent gaze point values G2, G3, G4 and so forth. In these examples, the algorithms have at their disposal three eye pictures B1, B2, B3 captured at increased frame rate during the wake-up burst and further eye pictures N1, N2, N3 captured at normal frame rate after the burst. N1 (N2) may refer to the most recent eye picture that is available when the second (third) gaze point value G2 (G3) is to be determined etc. In some examples, different algorithms may be used to compute the first gaze point value G1 on the one hand and to compute the subsequent gaze point values G2, G3, G4 on the other.

A first example algorithm, which uses three eye pictures to determine one gaze point, is described in terms of its input data for the different gaze points in Table 1.

TABLE 1

| First example algorithm | |
|---|---|
| Gaze point value | Input data |
| G1 | B1, B2, B3 |
| G2 | B2, B3, N1 |
| G3 | B3, N1, N2 |
| G4 | N1, N2, N3 |

The algorithm may optionally base the first gaze point value G1 on a contribution from the overview picture. Because the first gaze point value G1 is computed based on eye pictures captured at increased frame rate, it may be output at an early point. In order to compute the subsequent gaze point values G2, G3, G4, it is sufficient to capture further eye pictures at the gaze point update frequency. It is noted that B1, B2, B3 are nearly synchronous due to the increased frame rate; hence, even if B3 is the most recent eye picture from the burst, it may be advisable to utilize B1 or B2 in the computation of the third gaze-point value G3 if any of these is of better quality than B3. The quality may be automatically measured by one of the quality index described in the literature. The algorithm may also utilize all three of B1, B2, B3 to determine the second and third gaze point values G2, G3, however preferably with less weight for the third than the second considering their less recent dating.

A second example algorithm uses a preceding gaze point value as input when it determines the subsequent gaze point values G2, G3, G4. For the first gaze point value G1, any preceding gaze point value will belong to a different measuring session and will not be helpful. Instead, the first gaze point value G1 will be computed by means of the first example algorithm. Table 2 illustrates the operation of the second example algorithm.

TABLE 2

| Second example algorithm | |
|---|---|
| Gaze point value | Input data |
| G1 | B1, B2, B3 (and optionally the overview picture) |
| G2 | G1, N1 |
| G3 | G2, N2 |
| G4 | G3, N3 |

A third example algorithm derives a gaze point guess from individual eye pictures. From the three eye pictures B1, B2, B3 captured at increased frame rate during the wake-up burst, the algorithm derives gaze point guesses g(B1), g(B2), g(B3), and from the further eye pictures N1, N2, N3 captured at normal frame rate after the burst, it derives gaze point guesses g(N1), g(N2), g(N3). A gaze point guess may be computed by a method known per se in the art, e.g., PCCR. The third example algorithm computes a gaze point value by filtering the guesses. For instance, as described above, the gaze point value may be obtained by averaging. Table 3 illustrates the operation of the third example algorithm.

TABLE 3

| Third example algorithm | |
|---|---|
| Gaze point value | Input data |
| G1 | g(B1), g(B2), g(B3) |
| G2 | g(Bx), g(By), g(N1) |
| G3 | g(Bx), g(N1), g(N2) |
| G4 | g(N1), g(N2), g(N3) |

Here, Bx (By) denotes that eye picture from the burst which was assigned the highest (second highest) quality index. Optionally, the third example algorithm bases the first gaze point value G1 additionally on information derived from the overview picture. The gaze point determination may reject a current gaze point guess from the averaging if it is separated from the preceding gaze point guess by more than a predetermined threshold distance or threshold angle. This is evidence of a saccade or a similar sudden movement. The gaze tracking system 10 may then refrain from updating the current gaze point value and instead collect further eye imagery, so that a sufficient number of gaze point guesses (e.g., 3) are available to output a new gaze point value at the desired accuracy.

Embodiments

Advantageous embodiments of the invention further include the following:

1. A method in a gaze tracking system for controlling a computer device, said eye tracking system comprising at least one sensor arranged to receive light from the head of a viewer, wherein:

in response to a gaze tracking activation signal from input means of said computer device at said gaze tracking system, leaving a low power mode of said gaze tracking system;

capturing, at a first frame rate, a plurality of pictures of at least a portion of the viewer's head using said at least one sensor;

determining a first gaze point value of said viewer based on information from said plurality of pictures;

providing a first control signal based on said first gaze point value;

capturing, at a second frame rate, being lower than said first frame rate, further pictures of at least a portion of the viewer's head using said at least one sensor;

determining a further gaze point value of said viewer based on information from at least one of said further pictures; and providing a further control signal based on said further gaze point.

2. The method of embodiment 1, further comprising, prior to the capturing of said plurality of pictures, capturing an overview picture of at least a portion of the head of the viewer and locating an eye region of the viewer in the overview picture, wherein the first gaze point value is optionally determined based on additional information from the overview picture.

3. The method of embodiment 1 or 2, wherein:

said at least one sensor includes a light-sensitive surface arranged to receive light from the head of the viewer;

said plurality of pictures is captured by reading out data from said at least one sensor in restricted regions, which are positioned in accordance with the eye region location and the union of which occupies at most 10% of the area of the light-sensitive surface; and said further pictures are captured by reading out data from a less restricted or unrestricted region of the light-sensitive surface.

4. The method of any of embodiments 1 to 3, wherein:

the determination of the first gaze point is based on information from said plurality of pictures and optionally on additional information from the overview picture; and the determination of a further gaze point is based on information from said further picture and additionally on information from at least one previous picture.

5. A gaze tracking system (10) comprising:

at least one sensor (12) with a light-sensitive surface arranged to receive light from the head of a viewer, the at least one sensor being selectively operable at a second frame rate or an a first frame rate; and a processor (11) configured to respond to receipt, in a low power mode of the eye tracking system, of a gaze tracking activation signal (A) by performing the following:

causing the eye tracking system to leave the low power mode;

capturing a plurality of pictures of at least a portion of the viewer's head using said at least one sensor, from which data are read out at a first frame rate;

determining a first gaze point value of said viewer based on information from said plurality of pictures;

providing a first control signal based on said first gaze point value;

capturing further pictures of at least a portion of the viewer's head using said at least one sensor, from which data are read out at a second frame rate, being lower than said first frame rate;

determining, for each further picture, a further gaze point value of said viewer on the basis of at least one of said further pictures; and providing a further control signal based on said further gaze point.

6. A gaze tracking system (10) for controlling a computer device (20) associated with a visual display (23), the system comprising:

at least one sensor (12) with a light-sensitive surface arranged to receive light from the head of a viewer of the visual display, the at least one sensor being selectively operable to read out the light-sensitive surface at a second frame rate or a restricted region at a first frame rate, being higher than said second frame rate; and an overview imaging device (14) configured to capture an overview picture of at least a portion of the head of the viewer, characterized by a processor (11) configured to respond to receipt, in a low power mode of the eye tracking system, of a gaze tracking activation signal (A) from input means (22) of said computer device by performing the following:

causing the eye tracking system to leave the low power mode;

capturing an overview picture of at least a portion of the head of the viewer using said overview imaging device and locating an eye region of the viewer in the overview picture;

capturing a plurality of pictures of at least a portion of the viewer's head using said at least one sensor, from which data are read out at a first frame rate and in restricted regions, in which an image of an eye of the viewer is to be found and the union of which occupies at most 10% of the area of the light-sensitive surface;

determining a first gaze point value of said viewer on the visual display based on information from said plurality of pictures only and optionally on additional information from the overview picture;

providing a first control signal to the computer device based on said first gaze point value;

capturing further pictures of at least a portion of the viewer's head using said at least one sensor, from which data are read out at a second frame rate;

determining, for each further picture, a further gaze point value of said viewer on the basis of said further picture and additionally of at least one previous picture; and providing a further control signal to the computer device based on said further gaze point.

Equivalents, Extensions, Alternatives and Miscellaneous

Further embodiments of the present invention will become apparent to a person skilled in the art after studying the description above. Even though the present description and drawings disclose embodiments and examples, the invention is not restricted to these specific examples. Numerous modifications and variations can be made without departing from the scope of the present invention, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Reference is made to the discussion above, where it was emphasized that the gaze tracking system may be embodied in hardware, software or middleware executing under the operating system of a host computer system. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

What is claimed is:

1. A method for initiating control of a gaze tracking system from a low power mode, wherein the method comprises:

in response to a gaze tracking activation signal, leaving a low power mode of the gaze tracking system;

capturing, at a first frame rate, a first plurality of pictures of at least a portion of a head of a viewer using a first restricted region of a light-sensitive surface;
determining, based on only the first plurality of pictures a first gaze point value of the viewer;
providing a first control signal to a computer device based on the first gaze point value;
capturing, at a second frame rate, lower than the first frame rate, a second plurality of pictures of at least a portion of the head of the viewer using a second region of the light-sensitive surface;
determining a second gaze point value of the viewer based on a picture from the second plurality of pictures and a picture from the first plurality of pictures; and
providing a second control signal to the computer device based on the second gaze point value.

2. The method of claim 1, wherein:
the gaze tracking activation signal is provided from a physical input device.

3. The method of claim 1, wherein determining the first gaze point value comprises:
jointly filtering images in the first plurality of pictures.

4. The method of claim 3, wherein determining the second gaze point value comprises:
jointly filtering images in the second plurality of pictures and at least one picture from the first plurality of pictures.

5. The method of claim 1, wherein:
the first restricted region of the light-sensitive surface is 10 percent or less of the light-sensitive surface.

6. The method of claim 1, wherein:
the second region of the light-sensitive surface is larger than the first restricted region of the light-sensitive surface.

7. The method of claim 1, wherein:
a ratio of the first frame rate to the second frame rate is at least 2 to 1.

8. A system for initiating a gaze tracking system associated with a computer system from a low power mode, wherein the system comprises:
an eye tracking device;
one or more processors configured to:
in response to a gaze tracking activation signal, leaving a low power mode of the gaze tracking system;
capturing, at a first frame rate using a first restricted region of a light-sensitive surface of the eye tracking device, a first plurality of pictures of at least a portion of a head of a viewer;
determining, based on only the first plurality of pictures, a first gaze point value of the viewer;
providing a first control signal to a computer system based on the first gaze point value;
capturing, at a second frame rate lower than the first frame rate, using a second region of the light-sensitive surface of the eye tracking device, a second plurality of pictures of at least a portion of the head of the viewer;
determining a second gaze point value of the viewer based on a picture from the second plurality of pictures and a picture from the first plurality of pictures; and
providing a second control signal to the computer system based on the second gaze point value.

9. The system of claim 8, wherein determining the first gaze point value comprises:
jointly filtering images in the first plurality of pictures.

10. The system of claim 9, wherein determining the second gaze point value comprises:
jointly filtering images in the second plurality of pictures and at least one picture from the first plurality of pictures.

11. The system of claim 8, further comprising:
a physical input device for providing the gaze tracking activation signal.

12. The system of claim 8, wherein:
the second region of the light-sensitive surface is larger than the first restricted region of the light-sensitive surface.

13. The system of claim 8, wherein the eye tracking device comprises:
a rolling shutter sensor.

14. The system of claim 8, wherein:
the first restricted region of the light-sensitive surface overlaps the second region of the light-sensitive surface.

15. A non-transitory computer readable medium having instructions stored thereon executable by a computing device for initiating a gaze tracking system from a low power mode that when executed cause the computing device to perform operations comprising:
leaving a low power mode of the gaze tracking system in response to a gaze tracking activation signal;
capturing, at a first frame rate using a first restricted region of a light-sensitive surface, a first plurality of pictures of at least a portion of a head of a viewer;
determining, based on only the first plurality of pictures, a first gaze point value of the viewer;
providing a first control signal to a computer system based on the first gaze point value;
capturing, at a second frame rate lower than the first frame rate, using a second region of the light-sensitive surface, a second plurality of pictures of at least a portion of the head of the viewer;
determining a second gaze point value of the viewer based on a picture from the second plurality of pictures and a picture from the first plurality of pictures; and
providing a second control signal to the computer system based on the second gaze point value.

16. The non-transitory computer readable medium of claim 15, wherein:
the gaze tracking activation signal is provided by a physical input device.

17. The non-transitory computer readable medium of claim 15, wherein:
the gaze tracking activation signal is provided in response to a detected presence of a user.

18. The non-transitory computer readable medium of claim 15, wherein determining the first gaze point value comprises:
jointly filtering images in the first plurality of pictures.

19. The non-transitory computer readable medium of claim 18, wherein determining the second gaze point value comprises:
jointly filtering images in the second plurality of pictures and at least one picture from the first plurality of pictures.

20. The non-transitory computer readable medium of claim 15, wherein:
the first restricted region of the light-sensitive surface is 10 percent or less of the light-sensitive surface.

* * * * *